(12) United States Patent
Weeks et al.

(10) Patent No.: US 8,194,368 B2
(45) Date of Patent: *Jun. 5, 2012

(54) PROTECTIVE ELECTRICAL WIRING DEVICE WITH A CENTER NIGHTLIGHT

(75) Inventors: Richard Weeks, Little York, NY (US); Jeffrey C. Richards, Baldwinsville, NY (US); Gary O. Wilson, Syracuse, NY (US); Gerald R. Savicki, Jr., Canastota, NY (US); David A. Finlay, Sr., Marietta, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/987,648

(22) Filed: Jan. 10, 2011

(65) Prior Publication Data

US 2011/0156920 A1    Jun. 30, 2011

Related U.S. Application Data

(63) Continuation of application No. 11/933,956, filed on Nov. 1, 2007, now Pat. No. 7,869,171, which is a continuation-in-part of application No. 11/609,793, filed on Dec. 12, 2006, now Pat. No. 7,312,394, and a continuation-in-part of application No. 10/998,369, filed on Nov. 29, 2004, now Pat. No. 7,586,718, and a continuation-in-part of application No. 11/294,167, filed on Dec. 5, 2005, now Pat. No. 7,758,234, which is a continuation-in-part of application No. 11/242,406, filed on Oct. 3, 2005, now Pat. No. 7,285,721, which is a continuation of application No. 10/726,128, filed on Dec. 2, 2003, now Pat. No. 6,989,489.

(60) Provisional application No. 60/550,275, filed on Mar. 5, 2004, provisional application No. 60/439,370, filed on Jan. 9, 2003.

(51) Int. Cl.
*H02H 3/00* (2006.01)

(52) U.S. Cl. ......................................... 361/42; 307/118

(58) Field of Classification Search .............. 361/42–46, 361/111, 115, 50, 54, 95; 307/118, 326; 335/18, 21, 24; 439/107, 538, 650; 363/141, 363/144, 146

See application file for complete search history.

(56) References Cited

U.S. PATENT DOCUMENTS

| | | |
|---|---|---|
| 6,437,700 B1 | 8/2002 | Herzfeld et al. |
| 6,547,411 B1 | 4/2003 | Dornbusch |
| 6,873,231 B2 | 3/2005 | Germain et al. |

(Continued)

*Primary Examiner* — Rajnikant Patel

(74) *Attorney, Agent, or Firm* — Daniel P. Malley; Bond Schoeneck & King

(57) ABSTRACT

The present invention is directed to an electrical wiring device that includes a cover assembly is coupled to the housing. The cover assembly includes at least one set of receptacle openings disposed on either side of a central portion of the cover assembly in communication with a portion of the plurality of receptacle terminals. A fault detection circuit is configured to provide a fault detection output in response to detecting a fault condition. A circuit interrupter is coupled between the plurality of line terminals and the plurality of load terminals. A light assembly is coupled to the plurality of line terminals or the plurality of load terminals. The light assembly has a light transmission region disposed in the central portion and occupying a substantial portion of a width of the cover assembly. The light assembly is selectively driven from a deenergized state to a light emitting state in response to a predetermined stimulus.

31 Claims, 12 Drawing Sheets

U.S. PATENT DOCUMENTS

| | | |
|---|---|---|
| 6,920,025 B2 | 7/2005 | Nelson |
| 6,949,994 B2 | 9/2005 | Germain et al. |
| 6,963,260 B2 | 11/2005 | Germain et al. |
| 6,989,489 B1 | 1/2006 | Savicki, Jr. |
| 7,026,895 B2 | 4/2006 | Germain et al. |
| 7,036,948 B1 | 5/2006 | Wyatt |
| 7,118,235 B2 | 10/2006 | Barton |
| 7,285,721 B1 | 10/2007 | Savicki, Jr. |
| 7,298,598 B1 * | 11/2007 | Morgan et al. ............... 361/45 |
| 7,312,394 B1 | 12/2007 | Weeks et al. |
| 7,586,718 B1 * | 9/2009 | Radosavljevic et al. ........ 361/42 |
| 7,758,234 B1 | 7/2010 | Savicki, Jr. |
| 7,790,982 B2 * | 9/2010 | Weeks et al. ................... 174/50 |
| 7,869,171 B2 * | 1/2011 | Weeks et al. ................... 361/42 |
| 2005/0162789 A1 | 7/2005 | Germain et al. |
| 2006/0022777 A1 | 2/2006 | Germain et al. |
| 2006/0055490 A1 | 3/2006 | Germain et al. |
| 2006/0262462 A1 | 11/2006 | Barton |

* cited by examiner

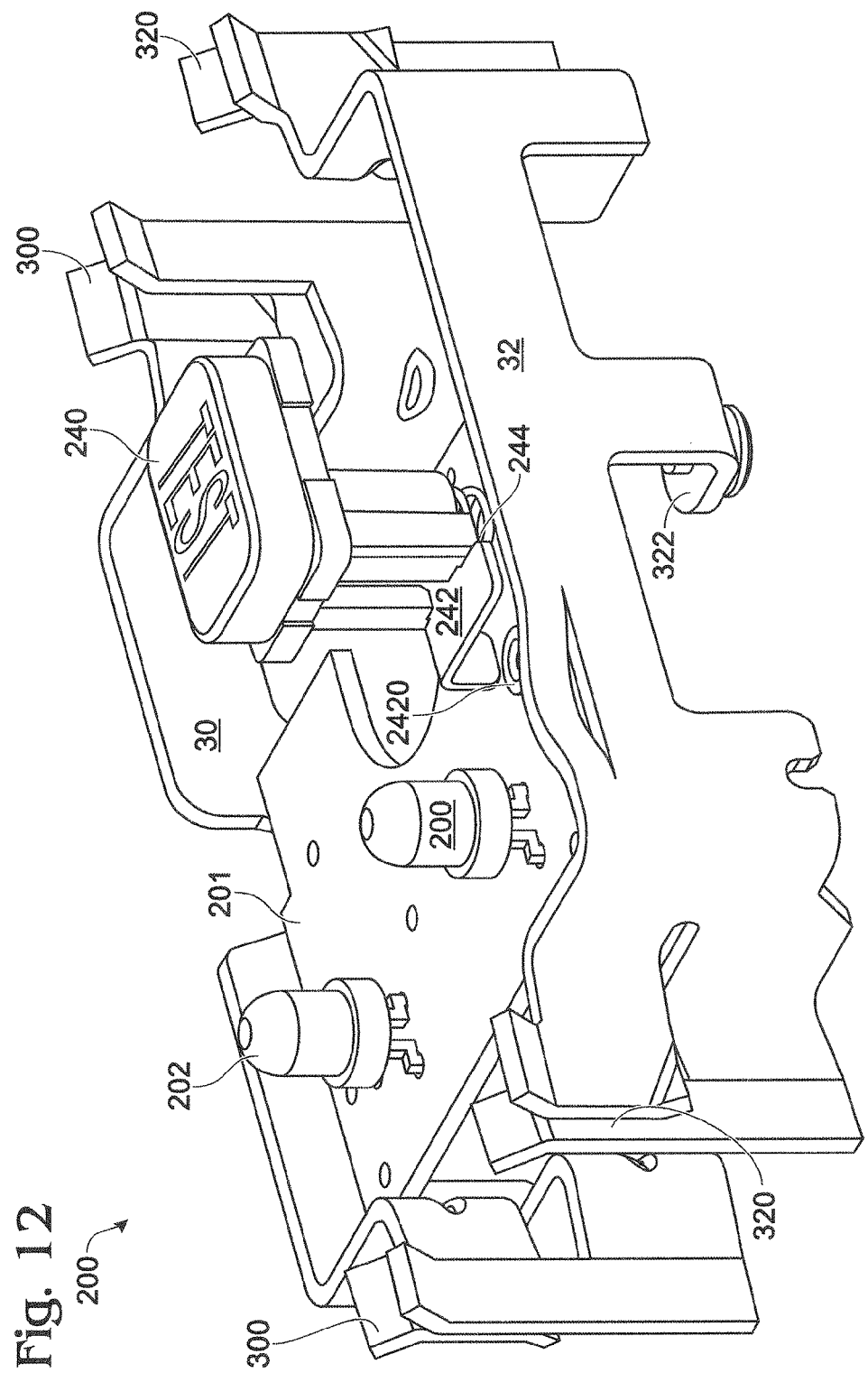

PROTECTIVE ELECTRICAL WIRING DEVICE WITH A CENTER NIGHTLIGHT

CROSS-REFERENCE TO RELATED APPLICATIONS

This is a continuation of U.S. patent application Ser. No. 11/933,956 filed on Nov. 1, 2007. U.S. patent application Ser. No. 11/933,956 is a continuation-in-part of U.S. patent application Ser. No. 11/609,793 filed on Dec. 12, 2006 and U.S. patent application Ser. No. 10/998,369 filed on Nov. 29, 2004, the contents of which are relied upon and incorporated herein by reference in their entirety, and the benefit of priority under 35 U.S.C. §120 is hereby claimed. U.S. patent application Ser. No. 10/998,369 claims the benefit of priority under 35 U.S.C. §119(e) to U.S. Provisional Patent Application Ser. No. 60/550,275, the content of which is relied upon and incorporated herein by reference in its entirety. U.S. patent application Ser. No. 11/933,956 is also a continuation-in-part of U.S. patent application Ser. No. 11/294,167 filed on Dec. 5, 2005, which is a continuation-in-part of U.S. patent application Ser. No. 11/242,406 (Now U.S. Pat. No. 7,285,721) filed on Oct. 3, 2005, which is a continuation application of U.S. patent application Ser. No. 10/726,128 filed on Dec. 2, 2003 (now U.S. Pat. No. 6,989,489), the contents of which are relied upon and incorporated herein by reference in their entirety, and the benefit of priority under 35 U.S.C. §120 is hereby claimed. U.S. patent application Ser. No. 10/726,128 claims the benefit of priority under 35 U.S.C. §119(e) to U.S. Provisional Patent Application 60/439,370 filed Jan. 9, 2003, the content of which is relied upon and incorporated herein by reference in its entirety.

BACKGROUND OF THE INVENTION

1. Field of the Invention

The present invention relates generally to electrical wiring devices, and particularly to electrical wiring devices having safety features.

2. Technical Background

The AC power interface for the typical electrical distribution system is commonly known as the breaker panel. The size of the breaker panel may vary depending on whether it is disposed within a residence, commercial building or some other such facility. The breaker panel, of course, terminates the AC power service provided by the power utility and distributes AC power to one or more branch electric circuits installed in the structure. Branch electric circuits often include one or more electrical wiring devices, such as receptacle outlets, that accommodate electrical power plugs.

Electrical wiring devices are provided in electrically non-conductive housings. The housing includes electrical line terminals that are electrically insulated from electrical load terminals. The line terminals connect the wiring device to conductive wires from the breaker panel. Load terminals are connected to downstream wiring that is configured to propagate AC power to one or more downstream electrical loads. Those of ordinary skill in the pertinent art will understand that the term "load" refers to an appliance, a switch, or some other electrically powered device. The load terminals of an electrical wiring device are sometimes referred to as "feed-through" terminals. As alluded to above, the AC power propagating through a device may be accessed by the user by way of a power plug. As everyone knows, the power plug and cord assembly for a portable electrical device functions as a portable device's AC power interface. A receptacle outlet provide power to portable "user-accessible loads" when the plug is inserted into a receptacle outlet. Certain types of faults are known to occur in branch electric circuits and electrical wiring systems. These faults represent serious safety issues that may result in fire, shock or electrocution if not addressed properly.

Accordingly, branch electric circuits typically employ one or more electric circuit protection devices. Protective devices employ a circuit interrupter disposed between the line terminals and the load terminals. The circuit interrupter provides power to the load terminals under normal conditions, but breaks electrical connectivity when the protective device detects a fault condition in the load circuit. There are several types of electric circuit protection devices including ground fault circuit interrupters (GFCIs), ground-fault equipment protectors (GFEPs), arc fault circuit interrupters (AFCIs), transient voltage surge suppressors (TVSSs), or surge protective devices (SPDs). This list includes representative examples and is not meant to be exhaustive. Some devices include both GFCIs and AFCIs. As their names suggest, arc fault circuit interrupters (AFCIs), ground-fault equipment protectors (GFEPs) ground fault circuit interrupters (GFCIs), transient voltage surge suppressors (TVSSs), or surge protective devices (SPD's) perform different functions. Electric circuit protective devices may be disposed within a circuit breaker that provides overcurrent protection, receptacle outlets, plugs, etc. Portable electrical wiring devices, e.g., hair dryers, etc., may also have a protective device disposed therein.

Another safety issue that is of great concern relates to the amount of ambient lighting in a given room or space. In a scenario that most people are familiar with, a person entering a darkened room will usually attempt to locate the wall switch and turn the wall switch to the ON position before entering. Sometimes the wall switch is not located near the door, i.e., at the point of entry, and the person will begin to search for the light switch. This person begins to "feel" her way around the darkened room in an attempt to navigate around objects such as tables and chairs. More often than not, the person successfully finds the wall switch and manages to turn the lights ON. On the other hand, the darkened room represents a safety issue. For example, if an object is disposed relatively low to the floor surface the person may trip over it and suffer an injury. This scenario applies to other types of spaces, such as corridors, theater aisles, stairways, patios, garages, ingress/egress areas, out-buildings, outdoor pathways and the like.

There are situations where a light switch is not available, or is not readily available. There are other situations where the person entering the darkened room is disinclined to turn the lights ON as a matter of courtesy. Several examples immediately come to mind. A person entering a darkened theatre would expect to incur the wrath of his fellow patrons if he turned the theatre lights ON while finding a seat. In another situation, a person may desire to temporarily enter a room occupied by a person who is sleeping. For example, a parent may want to check on the condition of a sleeping infant, or tend to someone who is ill, without having to turn the lights ON.

In one approach that has been considered, a portable lighting device may be inserted into an electrical receptacle located in the room to function as a "night light." While this arrangement may provide a temporarily solution to the potentially unsafe condition described above, it has certain drawbacks associated with it. The most obvious drawback in getting the portable nightlight into a socket in a darkened room is finding the socket in the first place. While this problem may be eliminated with forethought, many people live busy lives and have other things on their minds On the other hand, once the night light is inserted into the receptacle, it may remain there day and night for an extended period of time and represent a waste of energy. After awhile, the resident may notice the problem and unplug the light during daylight hours if the space admits natural light. Unfortunately, the resident may forget to plug the light back into the socket until after night fall and finds himself revisiting the darkened room scenario. In addition, once a small night light is unplugged from the receptacle there is the possibility that it will become lost, misplaced, or damaged from excessive handling.

In another approach that has been considered, a light element may be disposed in a wiring device in combination with another functional element such as a receptacle or a light switch. The wiring device is subsequently installed in a wall box or mounted to a panel. While this approach obviates some of the drawbacks described above, there are other drawbacks that come into play. Conventional permanent lighting elements such as incandescent and neon lights have a relatively short life expectancy of only a few years and, therefore, require periodic servicing and/or replacement. This problem is exacerbated by the fact that the light is typically hard-wired to power contacts disposed in the wiring device. As such, the light element is permanently ON, further limiting the light elements life expectancy of the device.

In yet another approach that has been considered, the aforementioned drawbacks are addressed by providing a light sensor, and the associated circuitry, to control the light element. When the sensor detects the ambient light level falling past a certain point, the control circuit turns the light element ON. One design problem associated with using a light sensor to selectively actuate the light element relates to providing a proper degree of isolation between the light sensor and the light element. Conventional devices solve the problem by separating the light sensor and the light element by as great a distance as possible. As such, conventional devices are typically arranged such that the lens covering the light element is disposed in one portion of the wiring device cover and the sensor element is disposed in a second portion of the cover, with sufficient space therebetween. If the wiring device includes another functional element such as a receptacle, the sensor may be disposed between the receptacle and the light's lens cover. Because the light sensor must be disposed a sufficient distance away from the light element, it necessarily requires that the lighting assembly be reduced in size to fit the wiring device form factor. Accordingly, conventional devices of this type often fail to provide an adequate amount of illumination for the intended application and, therefore, do not address the safety concern in a satisfactory manner.

What is needed is an electrical wiring device that includes a light source that is both adapted to a wiring device form factor and configured to address the drawbacks and needs described above. A light emitting wiring device is needed that provides a sufficient amount of illumination when the ambient light in a given space falls below a safe level. The wiring device must maximize the effective area of illumination without sacrificing sensor isolation. What is also needed is a wiring device that addresses both safety issues, i.e., electrical fault conditions as well as ambient lighting issues.

SUMMARY OF THE INVENTION

The present invention addresses the needs described above by providing an electrical wiring device that includes a light source that is both adapted to a wiring device form factor and configured to address the drawbacks and needs described above. The wiring device of the present invention may be configured to address both safety issues, i.e., electrical fault conditions as well as ambient lighting issues.

One aspect of the present invention is directed to electrical wiring device that includes a housing having a plurality of line terminals and a plurality of load terminals accessible via an exterior portion thereof. The housing includes a plurality of receptacle terminals disposed therein. The housing further includes a front cover portion having a central region. The front cover portion also including a plurality of receptacle openings in communication with the plurality of receptacle terminals. The device is in a properly wired state when the plurality of line terminals are coupled to a source of AC power, the device being in a miswired state when the plurality of load terminals are coupled to the source of AC power. A fault detection assembly is coupled to the plurality of line terminals, the fault detection circuit being configured to provide a fault detection output in response to detecting a fault condition. A circuit interrupter includes a first set of interrupting contacts configured to provide electrical continuity between the plurality of line terminals and the plurality of load terminals in a reset state and configured to interrupt the electrical continuity in a tripped state in response to the fault detection output. A protective assembly is coupled to the plurality of receptacle terminals. The protective assembly is configured to prevent AC power from being accessed via the plurality of receptacle openings when the device is in the miswired state. A light assembly includes a plurality of light emitting elements coupled to a lighting control circuit. The light assembly also includes a light transmission region disposed in the front cover portion and occupying a substantial portion of a width of the front cover portion. The lighting control circuit selectively drives the plurality of light emitting elements from a deenergized state to a light emitting state in response to a predetermined stimulus. The light emitting state is indicative of the reset state or an ambient light condition.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 12 is a perspective view of the center night light assembly in accordance with the third embodiment of the present invention;

DETAILED DESCRIPTION

Figure 2:
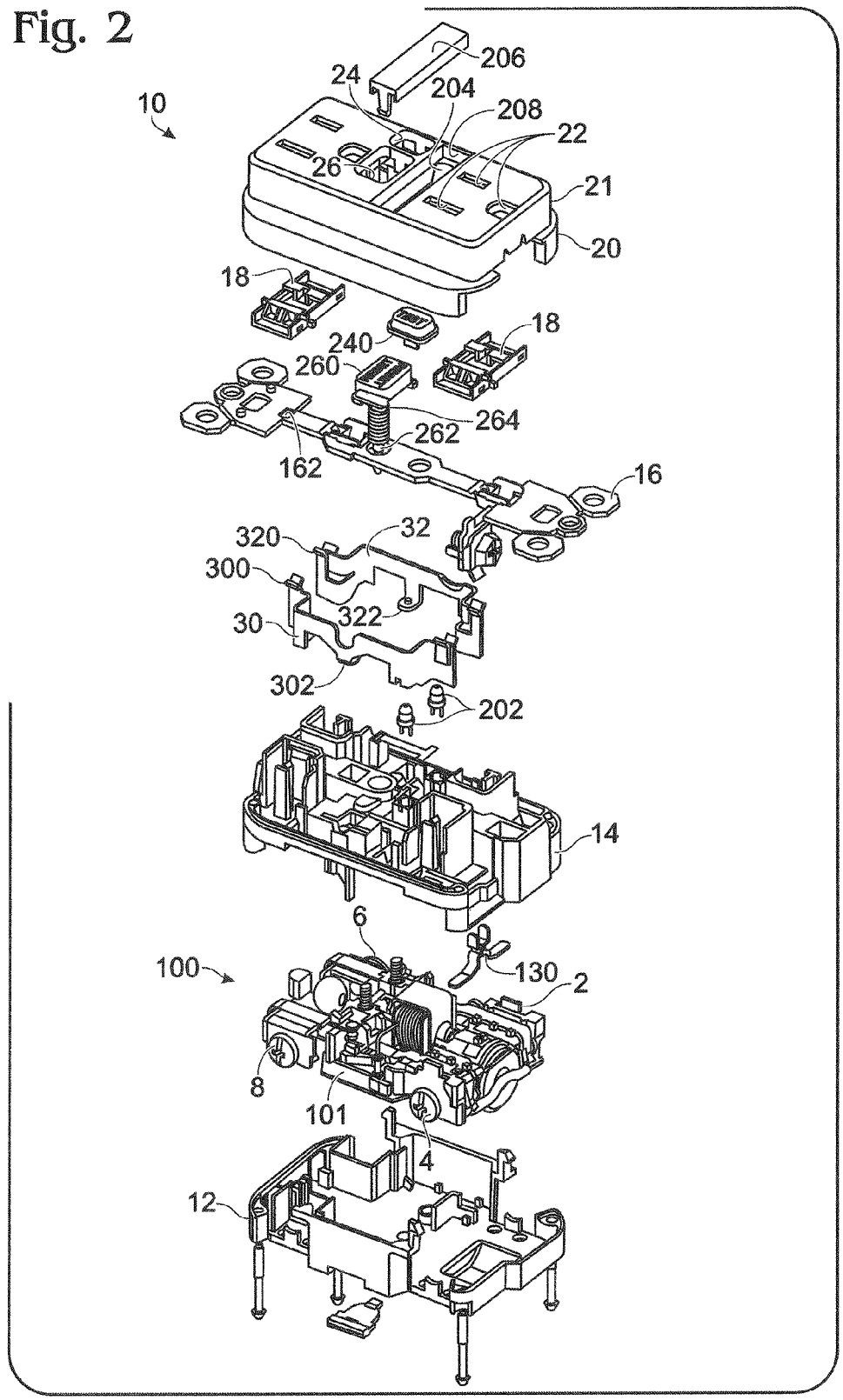
FIG. 2 is an exploded view of the device shown in FIG. 1.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the electrical wiring device of the present invention is shown in FIG. 2, and is designated generally throughout by reference numeral 10.

Figure 1:
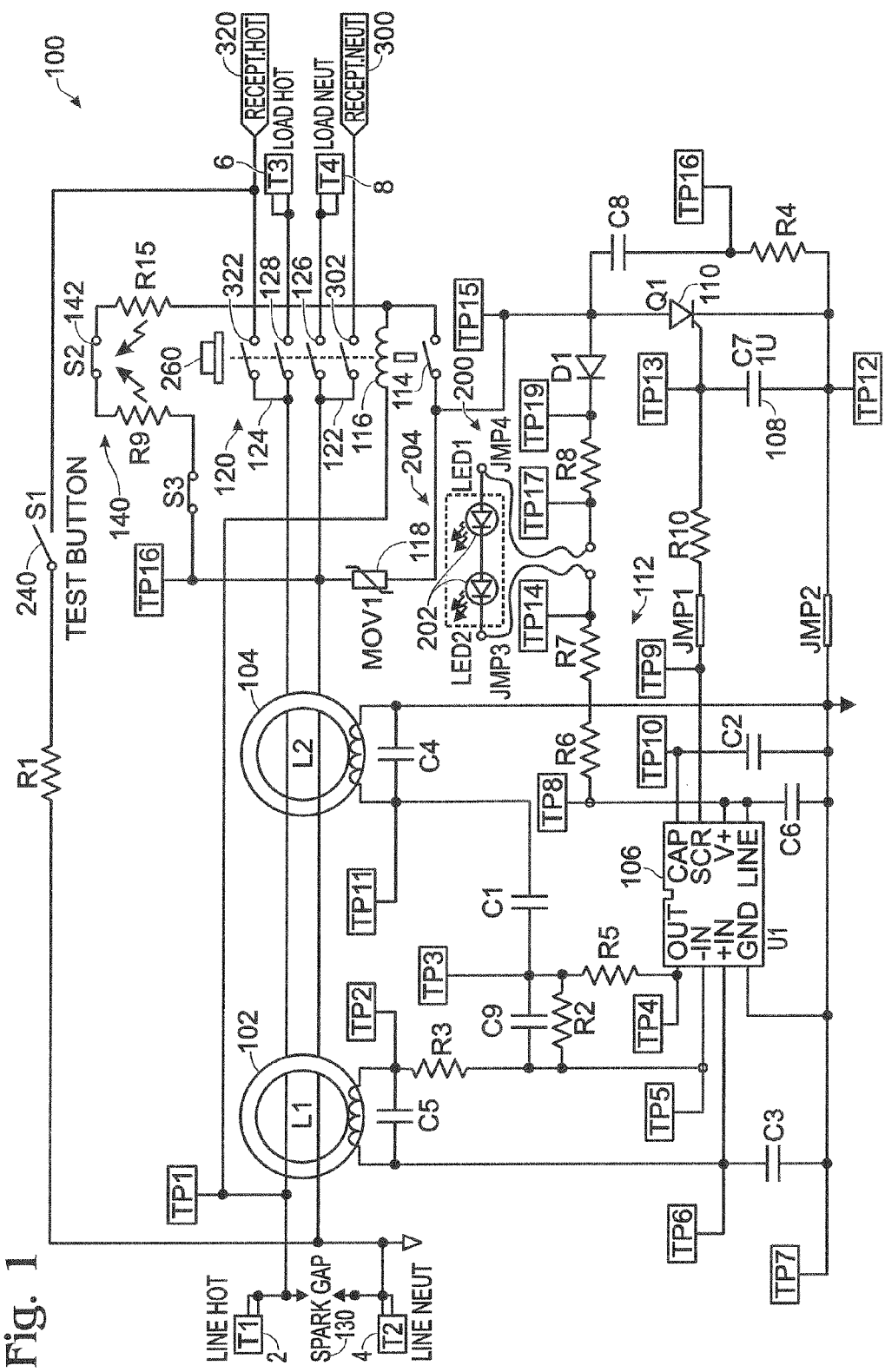
FIG. 1 is a schematic of the electrical wiring device in accordance with a first embodiment of the present invention.

As embodied herein, and depicted in FIG. 1, a schematic 100 of an electrical wiring device 10 in accordance with an embodiment of the present invention is disclosed. In this example, the schematic shows a protective device that includes ground fault interrupter circuitry. Device 10 includes line terminals (2, 4), load terminals (6, 8), and receptacle terminals (300, 320). Again, the load terminals 6, 8 may also be referred to herein as feed-through terminals. As noted above, these terminals may be connected to wiring configured to provide power to downstream receptacles or switches. Receptacle load terminals 300, 320 are configured to mate with an electrical plug to provide power to an appliance or other such user attachable loads. The line terminals 2, 4 are electrically connected to both load terminals 6, 8 and receptacle terminals 300, 320 when device 10 is reset. When in the tripped state, the circuit interrupter 120 disconnects the load terminals from the line terminals. In addition, the circuit interrupter may disconnect at least one feed-through terminal from a corresponding receptacle terminal.

The ground fault circuitry includes a differential transformer 102 which is configured to sense load-side ground faults. Transformer 104 is configured as a grounded neutral transmitter and is employed to sense grounded-neutral fault conditions. Both differential transformer 102 and grounded-neutral transformer 104 are coupled to detector circuit 106. Power supply 112 provides power for GFI detector circuit 106. Note that in this embodiment, the lighting assembly 200 is disposed in series with power supply 112. The light assembly 200 will be described in greater detail below. Referring back to the operation of the detection circuit, detector 106 provides an output signal on output pin 7 based on the transformer outputs. The detector output signal is filtered by circuit 108. Filter circuit 108 filters out noise to thereby substantially reduce the possibility of false tripping. The filtered output signal is provided to the control input of SCR 110. When SCR 110 is turned ON, solenoid 116 is energized. Solenoid 116 actuates the trip mechanism to thereby trip circuit interrupter 120. The trip solenoid 116 is energized until the circuit interrupter trips to remove the fault condition. Accordingly, there is no signal at output pin 7 and SCR 110 is turned OFF. The time that the solenoid remains energized is less than about 25 milliseconds. After the fault condition has been eliminated, circuit interrupter 120 may be reset by way of reset button 260.

Although FIG. 1 has disclosed a ground fault circuit interrupter circuit, those of ordinary skill in the art will understand that the present invention should not be construed as being limited to GFCIs. The present invention is suitable for use in other types of protective devices such as AFCIs. For example, the sensor in an AFCI is similar to transformer 102 but is typically configured to sense load current by way of a toroidal transformer or a shunt and/or line voltage by way of a voltage divider. The detector in an AFCI is similar to detector 106 but is configured to detect an arc fault condition on the basis of frequency spectra or high frequency noise bursts. Once an arc fault condition is detected, a signal is sent in a similar manner to an SCR which in turn activates a trip mechanism to trip the circuit interrupter. The TVSS (SPD) is another example of a protective device. During a lightning storm, the TVSS (SPD) limits the voltages in the distribution system to a safe level. The TVSS includes a voltage surge suppressing structure between hot and neutral terminals such as spark gap 130. Surge suppressing devices may be disposed between hot and ground terminals or between neutral and ground terminals. The surge suppressing device(s) are selected from a family of devices that includes spark gaps, MOVs, varistors, capacitors, avalanche and devices. More than one surge suppressing component may be disposed between a pair of terminals. Thus the spirit of the invention disclosed herein applies to GFCIs and to protective devices in general.

The present invention addresses certain end of life conditions by denying power when the device is unable to function. One end of life condition may cause the solenoid to remain energized when a fault condition is not present or when the circuit interrupter is in a tripped state. The solenoid is susceptible to burn-out when SCR 110 is permanently ON. This typically happens when SCR 110 is permanently shorted out. Most solenoids are configured to be energized only momentarily. They tend to burn out if energized for more than about 1 second. Once the solenoid burns out, the circuit interrupter is incapable of being tripped. As a result, the load terminals are permanently connected to the line terminals even when there is a fault condition.

In this embodiment, solenoid burn-out is prevented by an auxiliary switch 114. Auxiliary switch 114 is configured to open when circuit interrupter 120 is in the tripped position. If SCR 110 is shorted, or is permanently ON, auxiliary switch 114 ensures that solenoid 116 is not permanently connected to a current source. Accordingly, if reset button 260 is activated, circuit interrupter 120 resets but immediately trips in response to the trip mechanism, which in turn moves auxiliary switch 114 to the open position before solenoid 116 is able to burn out.

The auxiliary switch 114 provides other benefits. Those of ordinary skill in the art will understand that a metal oxide varistor (MOV) is frequently employed in protective devices to protect the electrical circuit from voltage surges that sometimes occur in the electrical distribution system. The end-of-life failure mode of a MOV is typically an electrical short. The resulting current can be enough to thermally damage the enclosure of the protective device. In one embodiment of the present invention, MOV 118 is connected in series with auxiliary switch 114 and trip solenoid 116 to eliminate most over-current situations. Thus, when MOV 118 reaches end of life and shorts out, trip solenoid 116 is energized to open auxiliary switch 114 and the flow of short circuit current is terminated before any damage ensues.

As noted above, the light assembly 200 is disposed in series with power supply 112. The schematic shows that the light assembly 200 includes at least two light emitting diodes 202. As such, light emitting diodes 202 are energized when the circuit interrupter 120 is reset and deenergized when the device is tripped. Thus, the light assembly 200 functions as a reset indicator in this embodiment.

Referring to FIG. 2, an exploded view of the device 10 embodying the schematic provided in FIG. 1 is shown. The device housing includes a back body 12 and separator member 14. The electromechanical components forming GFCI 100 are disposed therebetween. The GFCI 100 is inserted into back body 12 such that the line terminals (2, 4) and the load terminals (6, 8) are accessible to the installer. The spark gap structure 130 is disposed between the line terminals (2, 4). The separator is a molded member configured to accommodate both the various GFCI structures disposed underneath it as well as the receptacle terminal structures (30, 32) disposed above.

The neutral receptacle terminal structure 30 includes neutral face receptacle terminals 300 and a fixed contact 302. The terminal structure 30 is disposed in alignment slots formed in the separator 14 such that fixed contact 302 extends through separator 14 in alignment with the cantilevered line and load contacts in GFCI 100. The cantilevered structure is shown in greater detail in FIG. 3. The hot receptacle structure 32 is the mirror image of the neutral receptacle structure, and therefore, includes hot face receptacle terminals 320 and hot fixed contact 322. The ground strap 16 is also mounted within separator 14. The ground strap 16 includes an offset feature 162. The amount of offset roughly corresponds to the thickness of the tamper-resistant shutter mechanism 18. The offset 162 accommodates the thickness of the shutter mechanism 18 such that the front surface of the cover assembly 20 is flush with the wall plate after the device 10 is installed.

In this embodiment, LEDs 202 are connected to the printed circuit board 101 via pigtail wires (not shown for clarity of illustration) that extend through the separator 14. The LEDs 202 are inserted into a reflector portion 204 formed within the front cover assembly. Reflector 204 is described in greater detail below.

The cover assembly 20 includes face receptacle openings 22 disposed at either end thereof. A test button opening 24, reset button opening 26, and night light opening 208 are disposed in the surface area between the receptacle openings 22. Obviously, the test button opening 24 accommodates the test button 240 and the reset opening 26 accommodates the reset button 260. The night light opening 208 extends across substantially the entire width of mesa 21, which is the raised portion of the cover member 20. The night light is configured to accommodate lens element 206. Of course, the reflector member 204 is coupled to the underside of the cover 20 within opening 208.

The reset button 260 includes a stem portion 262 and coil spring 264 that extend through strap 16 and into the latch block disposed in GFCI 100. Therefore, the reset button is disposed on the central longitudinal axis of the device alongside the night light opening 208. The test button 240 is disposed alongside the reset button 260 on one side of the central latitudinal axis opposite the night light opening 208, which is disposed on the other side of the axis The major axis of the user accessible surfaces of the test and reset buttons are substantially normal to each other.

Turning now to the structure of the lighting assembly 200, in one embodiment, the reflector is a molded portion of the front cover. Of course, those of ordinary skill in the art will understand that the reflector 204 may be formed separately and snapped into place within opening 208 of front cover 20. The interior surface of the reflector 204 may be imbued with its reflective quality using any suitable method. For example, the surface may be formed using a relatively shiny white plastic material that is naturally reflective. The surface may be polished like a mirror. A reflective surface may be disposed over a plastic surface by painting or plating techniques known to those of ordinary skill in the art. Of course, separator 14 includes apertures disposed therein (not shown) that accommodate the LEDs 202. Those of ordinary skill in the art will understand that there may be one or more LEDs 202 employed within the scope of the present invention. In one embodiment, the LEDs are implemented using white LEDs that have a minimum 100° viewing angle. The amount of light emitted by each LED on its optical axis is greater than about 500 MCD (millicandelas). The reflector and lens are configured so that the intensity of the light emitted by LEDs 202 into a region of space surrounding device 10 is greater than about 20 millifootcandles. In another embodiment, the intensity of the emitted light is greater than about 50 millifootcandles.

Lens 206 is substantially flush with the front surface of the cover member 20. As noted previously, lens 206 extends across the full width of the front cover member 20. In one embodiment, the surface area of lens 206 measures 0.300 inches by 1.160 inches. Lens 206 is approximately 0.14 inches thick. If the separator is molded into the front cover 20, lens 206 snaps into opening 208 from the top. In an alternate embodiment (see FIG. 9), lens 206 has a "U-shaped" cross-section, having the same cross-sectional profile as "mesa" 21 formed in front cover 20. Lens 206 wraps around mesa 21 when it is inserted from above. Lens 206 may have lenticular lens elements formed on the interior surface disposed adjacent to the LEDs 202. As those of ordinary skill in the art will understand, lenticular lens elements diffuse incident light to thereby provide uniform illumination.

In yet another embodiment of the present invention, the combination of the LEDs 202, plug tail wires, separator 204, and lens 206 may be installed as a single unit that is snapped into the front cover.

Figure 3:
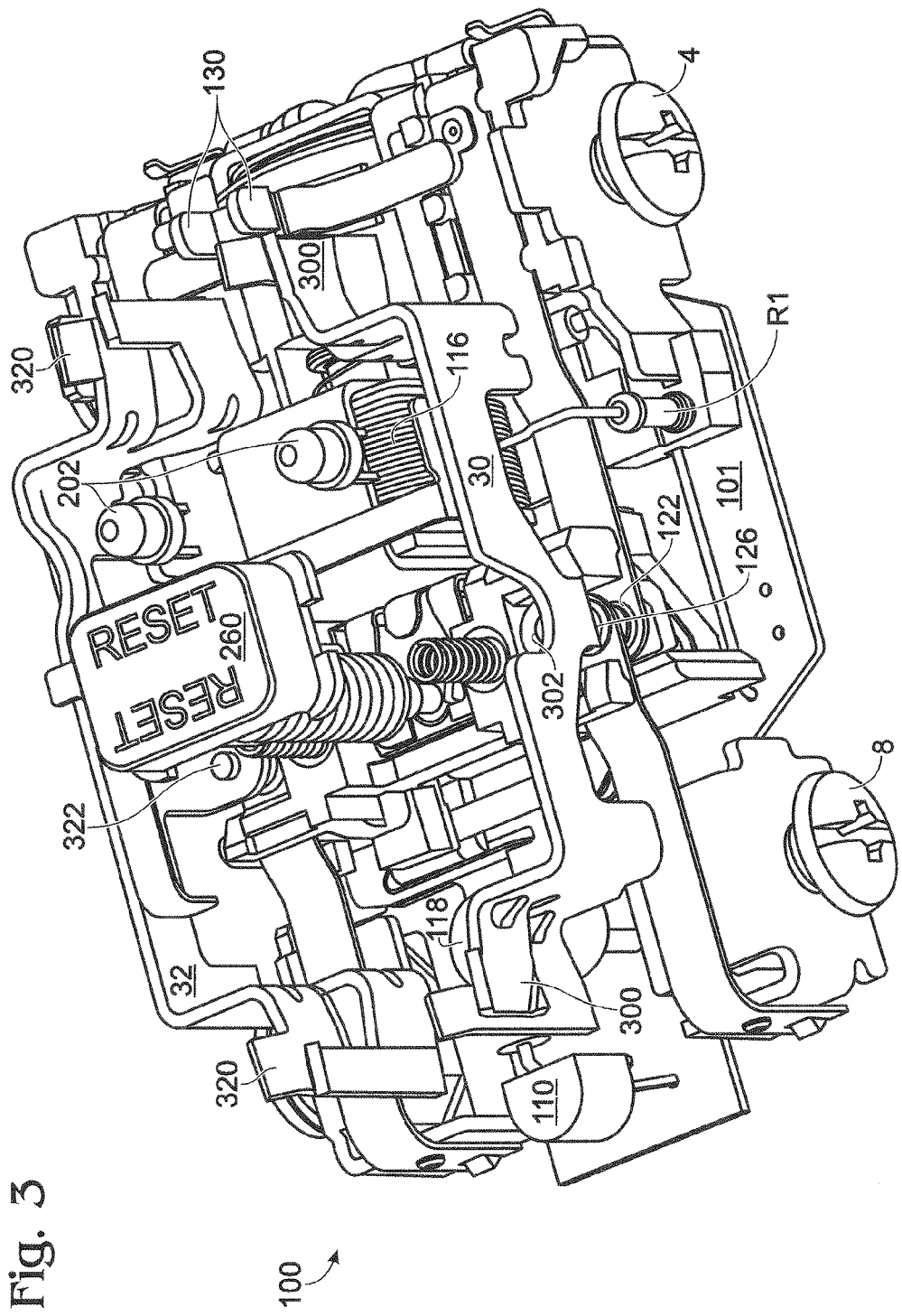
FIG. 3 is a perspective view of the device shown in FIG. 1 without the cover assembly or back body.

Referring to FIG. 3, a perspective view of the GFCI 100 portion of device 10 is shown with the back body 12, separator 14, and cover member 20 not shown. Of particular note is the position of the receptacle terminal structures (30, 32) with respect to the line and load cantilevers. Neutral line terminal 4 includes a line terminal which extends into the interior of the GFCI device. The neutral line cantilever includes contact 122 disposed at the end thereof. Neutral load terminal 8 also includes a cantilever having dual contact 126 at the end thereof. Contacts 122 and 126 are vertically aligned with fixed contact 302. Only hot fixed contact 322 may be seen on the "hot side of the circuit interrupting structure. However, those of ordinary skill in the art will understand that the hot interrupting contacts (124, 128 322) and the neutral interrupting contacts (122, 126, 302) form the four-pole circuit interrupter 120 that is shown schematically in FIG. 1. The LEDs 202 (lighting assembly 200) appear to be suspended in space in FIG. 3. In actuality, the LEDs 202 are connected to printed circuit board 101 via pig tail wires that are not shown in this view for clarity of illustration.

Figure 4:
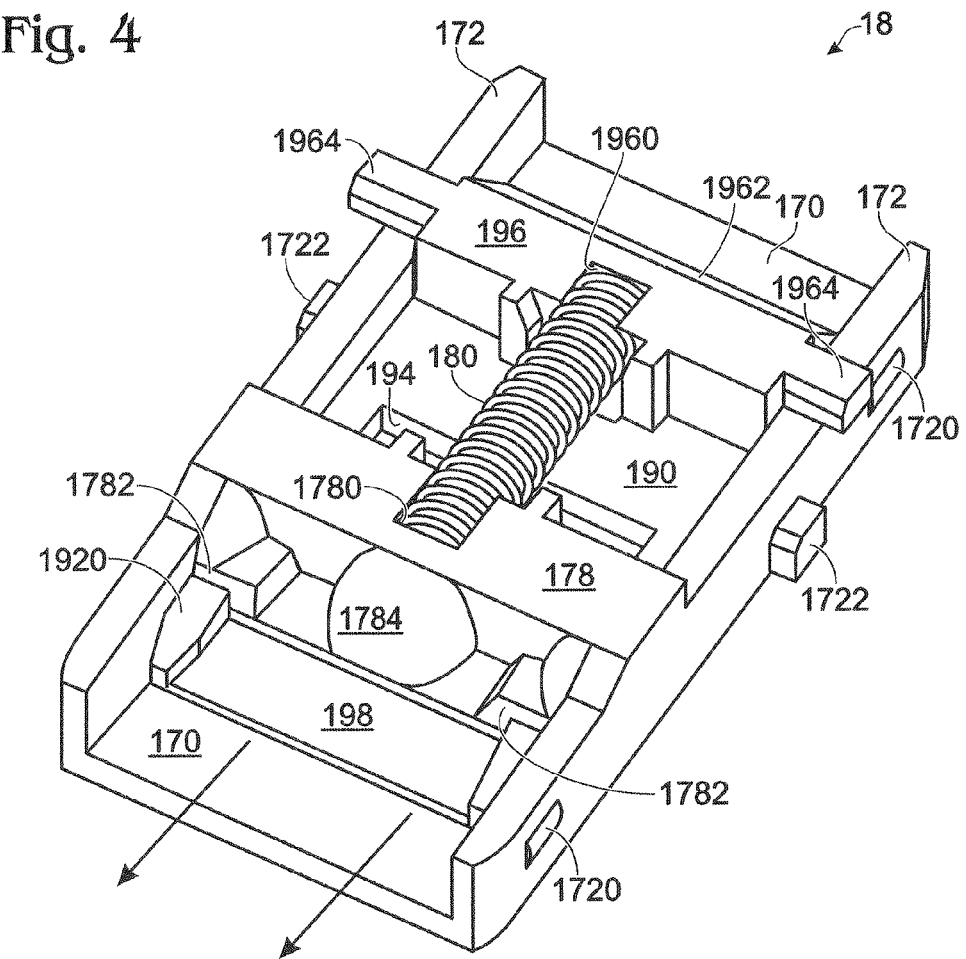
FIG. 4 is a perspective view of the shutter assembly optionally employed in conjunction with the present invention.

As embodied herein and depicted in FIG. 4, a perspective view of the shutter assembly optionally employed in the first embodiment of the present invention is shown. Reference is made to U.S. patent application Ser. Nos. 10/729,685, 10/900,778, and 11/609,793, which are incorporated herein by reference as though fully set forth in its entirety, for a more detailed explanation of various embodiments of the protective shutter assembly 18. The shutter assembly may be optionally employed in any of the embodiments disclosed herein.

When assembled, the upper shutter 190 is inserted into lower shutter 170 until stop members 1920 extend beyond rail guides 1782 and snap into place. This position represents the closed position, wherein the upper transverse structure 196 covers neutral aperture 174 (not shown) and upper base 198 covers hot aperture 176 (not shown). The lower shutter member 170 and the upper shutter member 190 are movable relative to each other from the closed position to the open position in response to being simultaneously engaged by the hot plug blade and the neutral plug blade of an electrical plug. To facilitate this movement, shutter members (170,190) are made from a family of plastics having natural lubricity. These include nylon 6-6, Delrin, and Teflon. Shutter members (170, 190) may be made from a substrate on which these materials are coated, the substrate having a differing flammability or flexural characteristic.

If a foreign object having a width substantially the same as a hot plug blade is inserted into the hot receptacle opening, the shutter assembly remains closed. The foreign object causes ramp 1784, and therefore, lower shutter 170, to move. However, this foreign object insertion does not cause upper shutter 190 to move relative to shutter 170. As a result, the foreign object inserted into the hot receptacle opening strikes base member 198 of the upper shutter. On the other hand, if a foreign object having a width substantially the same as a neutral plug blade is inserted into the neutral receptacle opening, transverse structure 196 will move upper shutter 190 but not move lower shutter 170. Accordingly, the lower base member 173 does not move and the neutral aperture 174 (not shown) is not exposed. Thus, the foreign object inserted into the neutral receptacle opening strikes lower base member 173.

Only when the hot plug blade and the neutral plug blade of an electrical plug simultaneously engage ramp 1784 and ramp 1962, respectively, will the lower shutter member 170 and the upper shutter member 190 move relative to each other from the closed position to the open position. In the open position, the lower hot aperture 176 is aligned with the upper hot contact aperture 194 and, the inward edge of the lower neutral contact aperture 174 is substantially aligned with the outer edge of ramp 1962. In this position, the lower shutter 170 and the upper shutter 190 allow the plug contact blades to pass through the protective shutter 18 and engage the contacts disposed in the interior of the electrical wiring device. On the other hand, a foreign object such as a hairpin is likely to slide off of either side of ramp 1784 or ramp 1962. Obviously, if the foreign object has slid off the ramp, force cannot be applied to the object to open the corresponding shutter.

In another embodiment, the predetermined electrical plug geometry that opens the shutters may include only some of the characteristics that have been described. The geometry may include just one or more of the following: two plug blades separated by a predetermined distance, plug blades contacting the two blade structures simultaneously, a neutral plug blade having a predetermined width, or a hot plug blade having a predetermined width. Plug blade width will not matter if ramps 284 and/or 462 approach the widths of their respective contact structures.

In another embodiment, shutters (170, 190) open in response to the insertion of two objects without particular heed given to their geometries. This may be accomplished by extending the widths of ramp 1784 and ramp 1962 so that regardless of the sizes of the objects, there is nowhere for either or both objects escaping the ramps as they are inserted into the device. As such, it is assured that the two shutters will open.

The movement of the upper shutter 190 and the lower shutter 170 is effected by spring member 180. The spring member 180 is configured to bias the frameless shutter sub-assembly, i.e., lower shutter 170 and upper shutter 190, in the closed position. Spring member 180 is compressed further in the open position and, therefore, opposes movement of the frameless shutter sub-assembly from the closed position to the open position. Accordingly when the electrical plug is removed, the spring moves the frameless shutter sub-assembly from the open position to the closed position. Stated differently, only a single spring is necessary to effect the closed position of the shutter assembly.

As alluded to above, the protective shutter assembly 18 includes a spring retainer mechanism. The spring retainer mechanism includes lower shutter retainer pocket 1780 and upper shutter retainer pocket 1960. The spring retainer mechanism is configured to retain the spring member 180 within the frameless shutter sub-assembly and substantially prevent the spring member from being separated from the frameless shutter sub-assembly. As those of ordinary skill in the art will appreciate, the protective shutter assembly 18 may be dropped and/or exposed to vibrational and/or mechanical forces during automated assembly. As shown in FIG. 4, retainer pockets (1780, 1960) are equipped with retainer lips that prevent the spring member from being jarred loose.

Figure 5:
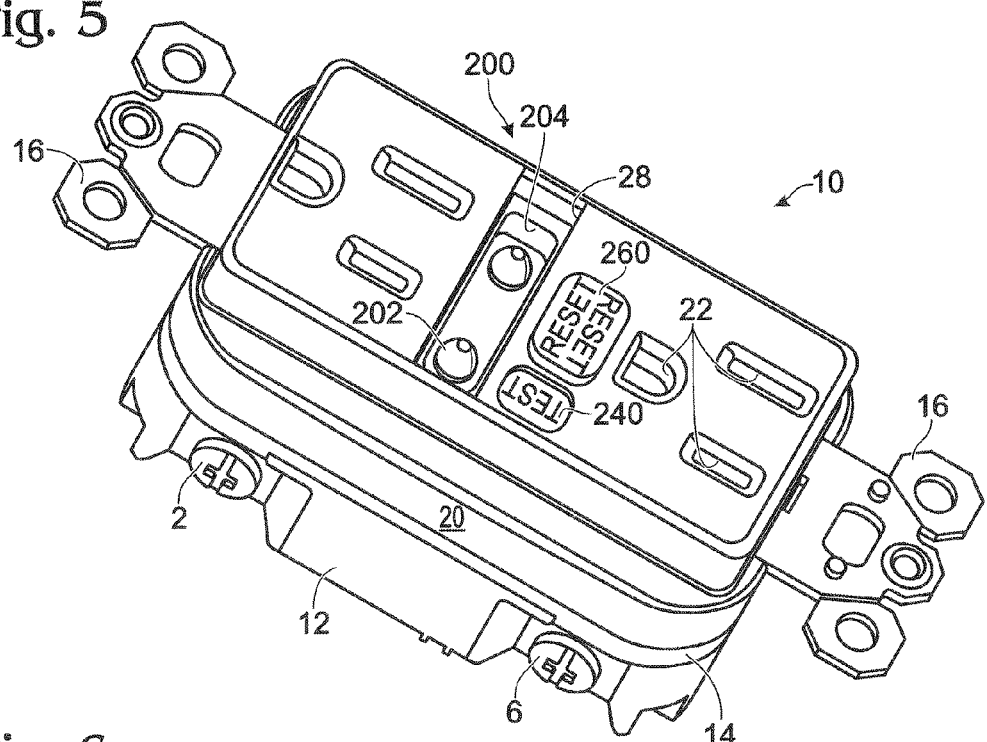
FIG. 5 is a perspective view of the device shown in FIG. 1 without the center night light lens.
Figure 6:
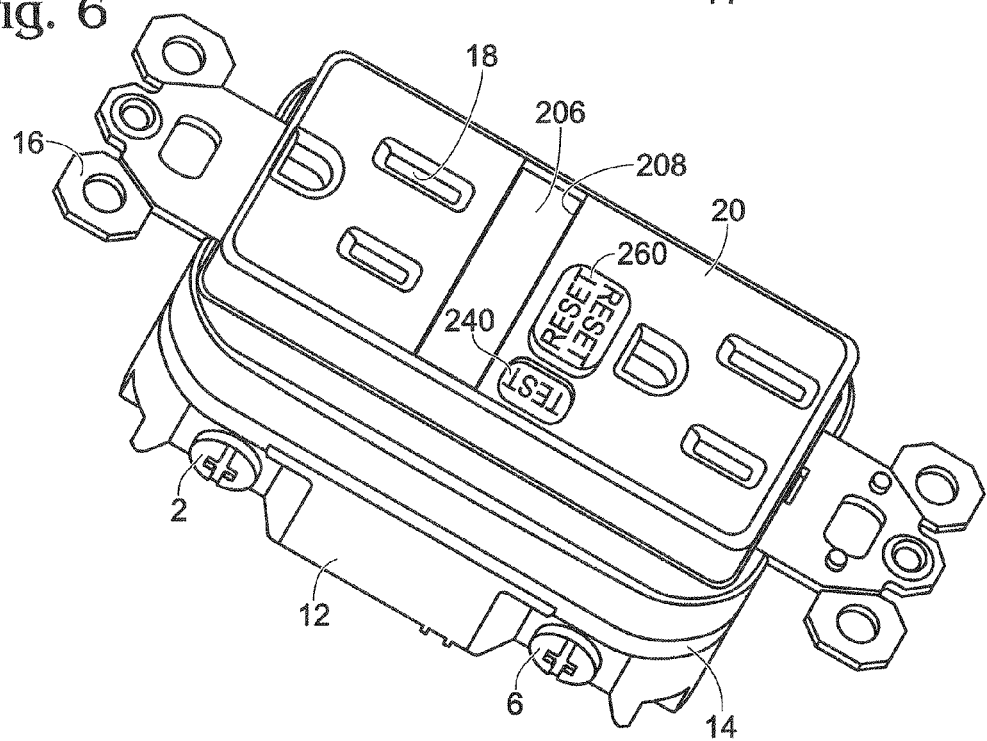
FIG. 6 is a perspective view of the fully assembled device shown in FIG. 1.

Referring to FIG. 5, a perspective view of device 10 without the center night light lens 206 is shown. This view clearly shows reflector member 204 disposed within the front cover member 20. In the embodiment shown, two LEDs 202 are disposed within the reflector member 204. The "bathtub" shape of the interior surface of the reflector is configured to redirect light emitted from the side portions of LEDs 202 out from opening 208. As noted above, the reset button 260 and test button 240 are disposed adjacent to the light assembly 200 in the manner previously described. FIG. 6 is a perspective view of the fully assembled device with lens element 206 in place. The lens element is substantially flush with respect to the front surface of cover member 20.

Figure 7:
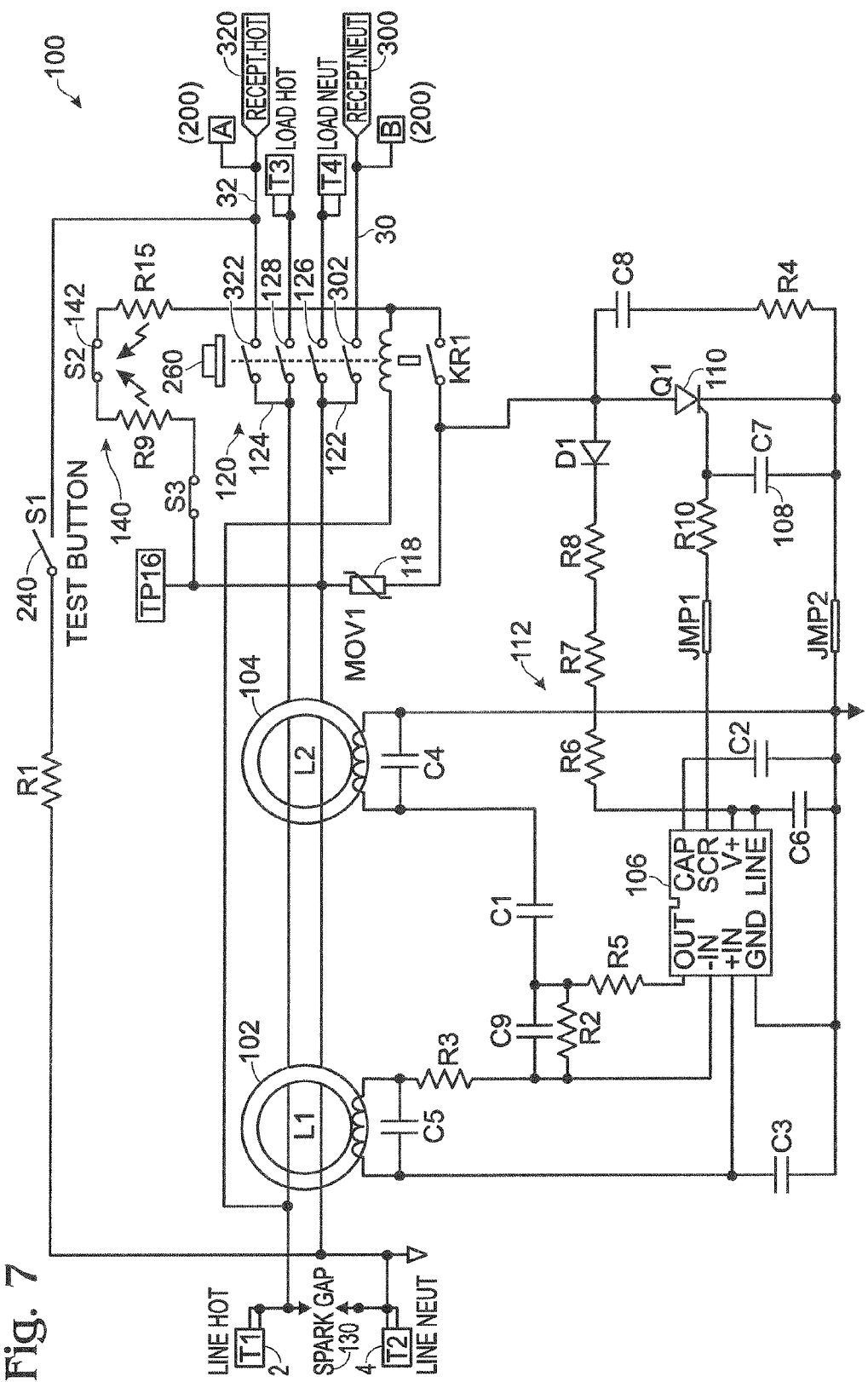
FIG. 7 is a schematic of the electrical wiring device in accordance with a second embodiment of the present invention.

As embodied herein, and depicted in FIG. 7, a schematic of a circuit protection device 10 in accordance with a second embodiment of the present invention is disclosed. The schematic shown in FIG. 7 is almost identical to the one shown in FIG. 1. In FIG. 1, the lighting assembly 200 is disposed between resistors R7 and R8. In FIG. 7, light assembly 200 is not included in the power supply circuit 112. The power supply includes diode D1, and resistors R6, R7, and R8 in series. In this second embodiment, the hot receptacle terminal structure 32 is connected to the light assembly 200 by way of connection "A". The neutral receptacle terminal structure 30 is connected to the light assembly 200 by way of connection "B". Because the other elements in the schematic shown in FIG. 7 are identical to FIG. 1, the description of the circuit is not repeated for brevity's sake.

Figure 8:
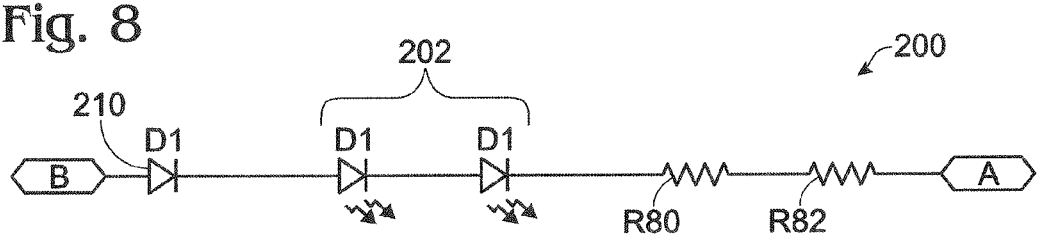
FIG. 8 is a schematic of the center night light assembly in accordance with the second embodiment of the present invention.

Referring to FIG. 8, a schematic of the center night light assembly 200 in accordance with the second embodiment of the present invention is shown. As shown in FIG. 7, connection "B" is connected to the neutral receptacle terminal structure 30. The light assembly circuit 200 includes a current rectifying diode D1 in series with LEDs 202 and current limiting resistors R80, and R82. Comparing FIG. 7 and FIG. 8, it becomes apparent to those skilled in the art that the lighting assembly 200 again functions as a reset indicator. When the device is in the reset state, LEDs 202 are ON. When the device is tripped, the LEDs 202 are OFF.

Figure 9:
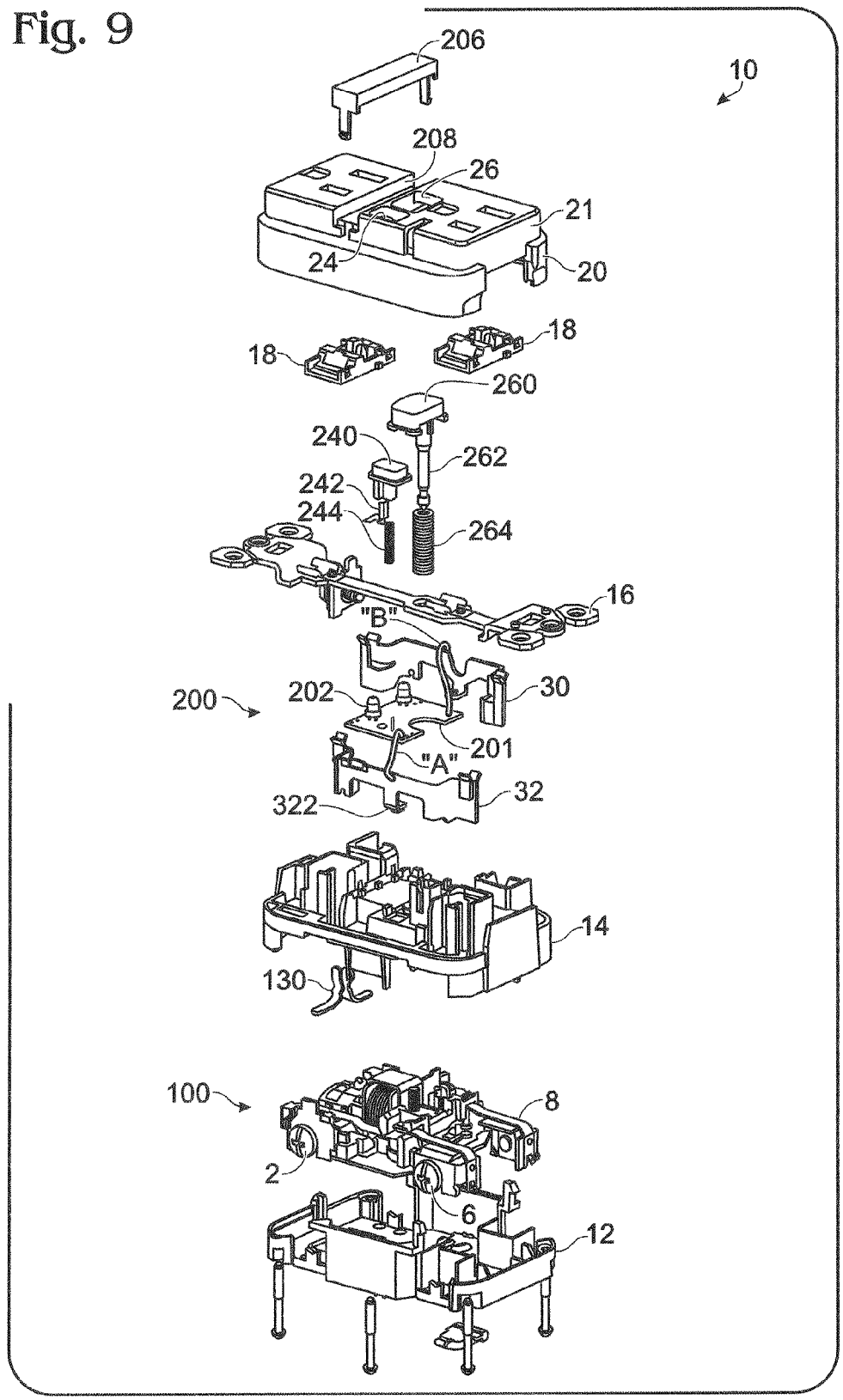
FIG. 9 is an exploded view of the device shown in FIG. 7.

FIG. 9 is an exploded view of the second embodiment of the present invention previously discussed relative to FIGS. 7-8. FIG. 9 is very similar to the exploded view previously shown in FIG. 2. Accordingly, a description of like features is omitted for brevity's sake and only the differences are explained. In the second embodiment, lens 206 has a "U-shaped" cross section similar to the cross-sectional profile as "mesa" 21 formed in front cover 20. Lens 206 wraps around mesa 21 when it is inserted into opening 208 from above. Another difference between the first embodiment and the second embodiment relates to the light assembly 200 implementation. In the second embodiment, the light assembly 200 is disposed on a satellite printed circuit board 201. Connection points "A" and "B" are implemented as soldered pig tail wires disposed between PCB 201 and the terminal structures 30, 32.

Figure 10:
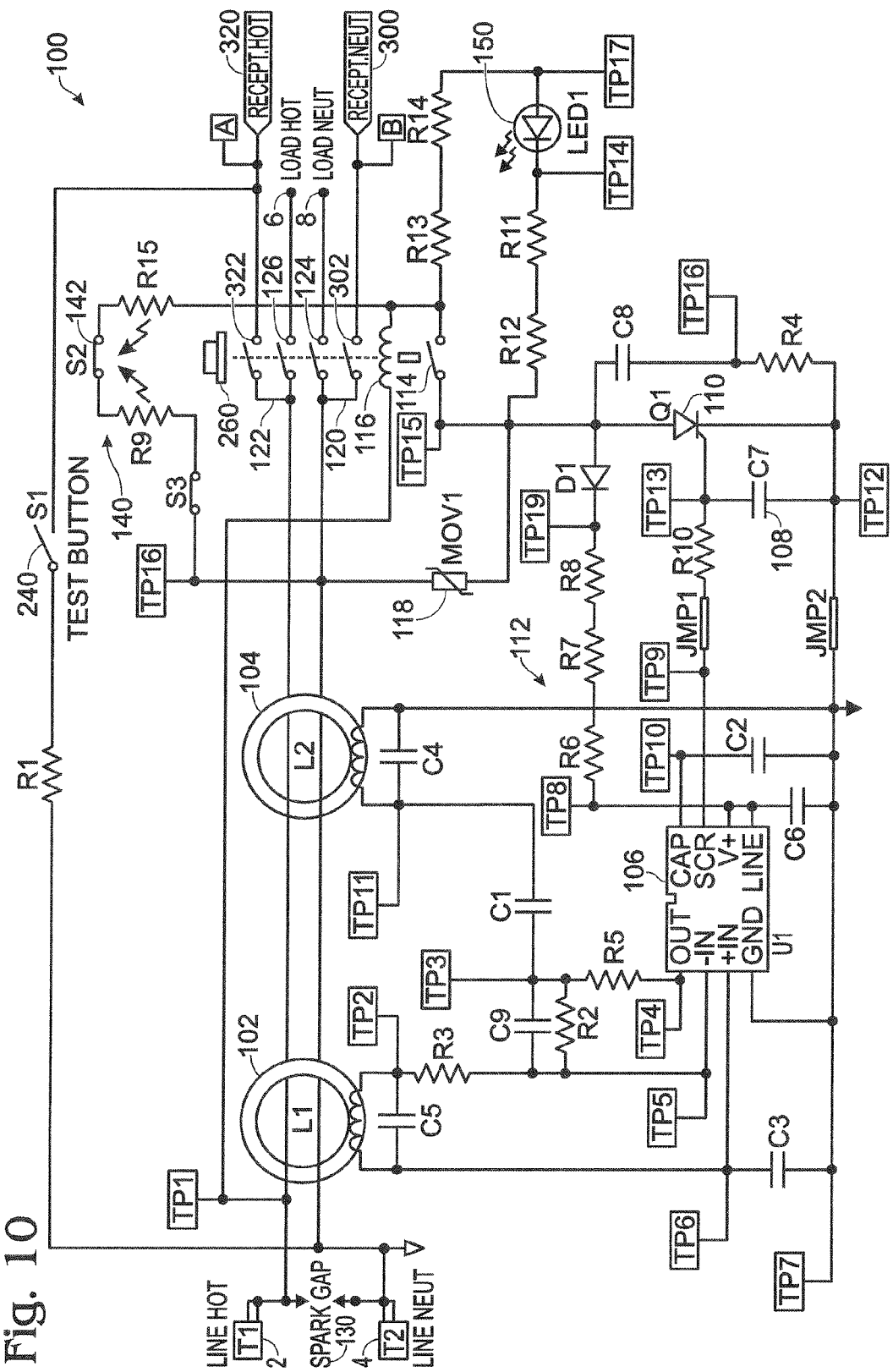
FIG. 10 is a schematic of the electrical wiring device in accordance with a third embodiment of the present invention.

As embodied herein and depicted in FIG. 10, a schematic of a circuit protection device 10 in accordance with a third embodiment of the present invention is disclosed. The schematic shown in FIG. 10 is very similar to the schematics provided in FIGS. 1 and 7. Again, in FIG. 10, light assembly 200 is not included in the power supply circuit 112. Like the second embodiment, the hot receptacle terminal structure 32 is connected to the light assembly 200 by way of connection "A". The neutral receptacle terminal structure 30 is connected to the light assembly 200 by way of connection "B". Any description of the circuit elements (FIG. 10) that are identical to those shown in FIG. 1 and FIG. 7 would be repetitious and superfluous, and therefore, is omitted.

The third embodiment includes an additional indicator 150 disposed in parallel with auxiliary switch 114. As noted above, the auxiliary switch 114 is configured to open when circuit interrupter 120 is in the tripped position. If SCR 110 is shorted, or is permanently ON, auxiliary switch 114 ensures that solenoid 116 is not permanently connected to a current source. Accordingly, if reset button 260 is activated, circuit interrupter 120 resets but immediately trips in response to the trip mechanism, which in turn moves auxiliary switch 114 to the open position before solenoid 116 is able to burn out. The indicator 150 is implemented as a trip indicator, emitting a visual and/or audible indicator signal when circuit interrupter 120 is in the tripped state, i.e., when the auxiliary switch 114 is open. The trip indicator LED 150, therefore, is energized when there is power on the line terminals and the circuit interrupter is in the tripped condition. The indicator 150 is OFF when device 10 is in the reset state. Indicator 150 may be implemented as a red LED or as an audible indicator, or both. The indicator may also be configured to emit a repetitive signal (flashing or beeping).

Figure 11:
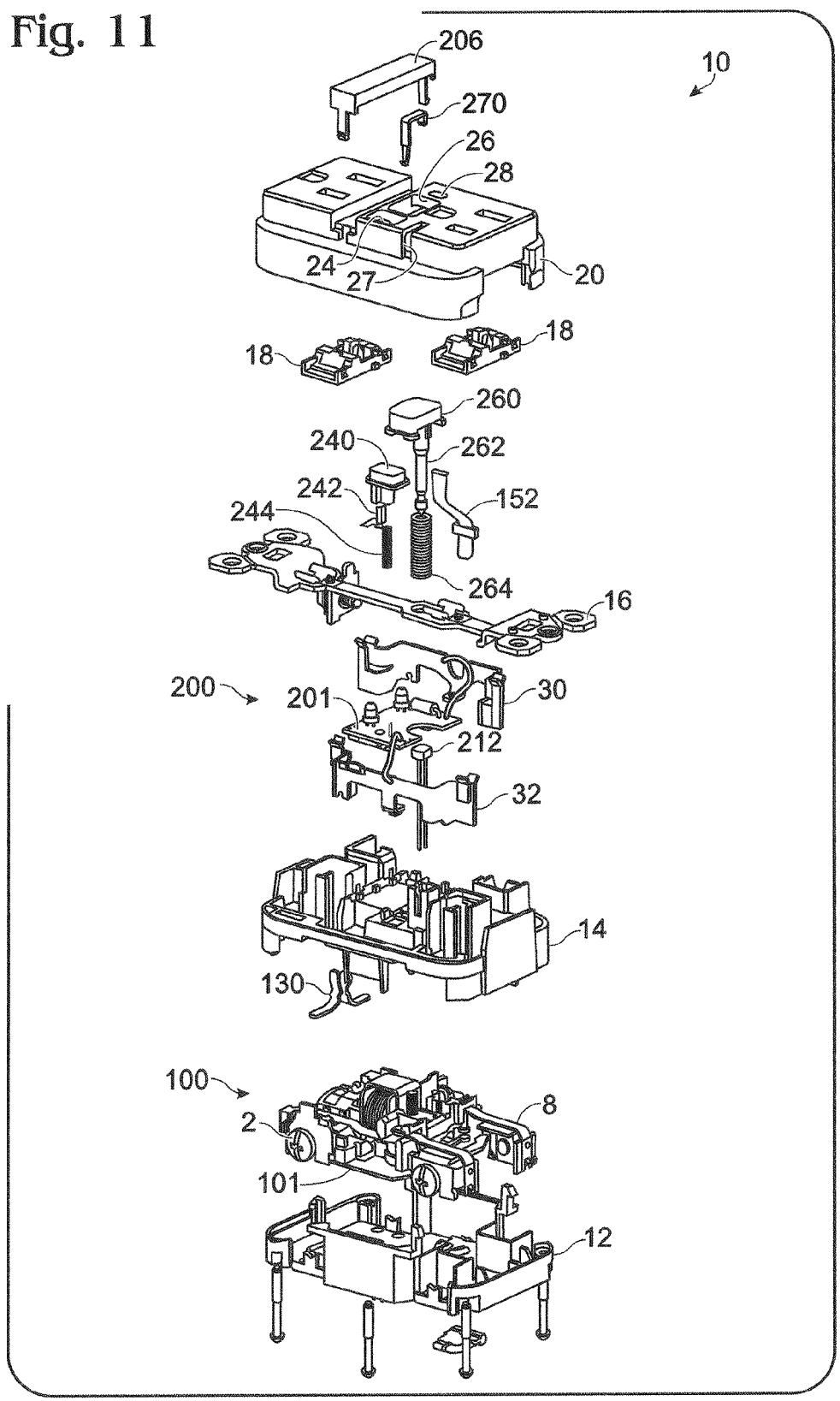
FIG. 11 is an exploded view of the device shown in FIG. 11.

FIG. 11 is an exploded view of the device shown in FIG. 10. In this embodiment, cover 20 includes indicator opening 28 for indicator 150. Indicator 150, which is disposed on the main PCB 101, is in optical communication with opening 28 by way of light pipe 152. Notched opening 27 accommodates lens window element 270. Lens 270 is configured to cover the ambient light sensor 212. The window lens 270 may be implemented using a translucent "wrap-around" lens of the type shown in FIG. 11, or alternatively, the front cover 20 may include an integral translucent lens portion. In any event, lens 270 is configured to direct the ambient light in the spatial volume proximate device 10 toward ambient light sensor 212.

The window or lens are disposed in the front user accessible surface of the device, or alternatively, may "wrap around" the edge of the user accessible surface. Reference is made to U.S. patent application Ser. No. 10/998,369, filed on Nov. 29, 2004, which is incorporated herein by reference as though fully set forth in its entirety, for a more detailed explanation of the sensor lens element 270. Ambient light is transmitted to the ambient light sensor 212 by way of the two outer surfaces of the wrap-around lens. These two surfaces are approximately normal to each another. An optical blocking structure is included such that light sensor 212 receives ambient light but not light emitted by light assembly 212. In one approach, reflector member 204 is made out of an opaque material. In another, the inner (or outer surfaces) of the reflector member are painted or plated with an opaque material. In another, the ambient light sensor 212 is mounted such that the printed circuit board 201 serves as a blocking structure. In another, the light blocking structure is connected to (or integral to) the front cover 20 or separator member 14. In another, lens 270 includes a light pipe disposed to couple ambient light, instead of light generated by the wiring device, to the light sensor. In yet another, the wrap-around lens is configured for sensing ambient light predominantly from the side surface of front cover 20. This configuration reduces the likelihood that reflected light from lens 206 will pollute the ambient light.

Referring to FIG. 12, a detail perspective view of the center night light assembly 200 in accordance with the third embodiment of the present invention is shown. As shown, white LEDs 202 are connected to PCB 201. PCB 201 is disposed between terminal structure 30 and terminal structure 32 in the manner shown. The pig tail connections (A, B) are not shown in this view.

The main PCB 101 may be manufactured in a "six up array." PCB 101 has a non-rectangular shape, necessitating the removal of excess printed circuit board material. This material is typically wasted. However, the size of the waste regions are big enough to be used as satellite boards 201. Thus, the use of the satellite boards represents an efficient use of material.

Note that the test button 240 is coupled to PCB 201 via compression spring 244. Moveable switch member 242 is connected to test button 240. Switch member 242 is formed from an electrically conductive material that need not be flexible. Spring 244 biases test switch member 242 in the open position. In the open position, there is an air gap between contact 2420 and one end of the switch member, and another between hot receptacle contact structure 32 and the other end of switch member 242. When the test button is depressed, the test switch is closed. Switch member 242 bridges hot receptacle terminal 32 and contact 2420. Contact 2420, of course, is coupled to the neutral line conductor in the manner shown in FIG. 7. This structure facilitates the novel arrangement of the test button, reset button 260, and the light assembly within the center portion of the cover assembly 20. Because of the added functionality in the third embodiment, there is not enough room in the device for a cantilever beam actuated by the test button. Instead of a cantilever, a compression switch structure 242 is included. This switch mechanism has two advantages. First, it is more compact than a cantilever structure. Second, by virtue of the switch closing two air gaps instead of one air gap, the test button need only travel half the distance to make connection. The reduced distance is important because the compact switch structure does not provide the mechanical advantage that is provided by the traditional cantilever test blade. As shown in the schematic (FIG. 10), the test switch is connected in series with resistor R1, typically 15K Ohms Reference is made to U.S. patent application Ser. No. 10/953,805, filed on Sep. 29, 2004, which is incorporated herein by reference as though fully set forth in its entirety, for a more detailed explanation of a dual air gap test button switch.

Figure 13:
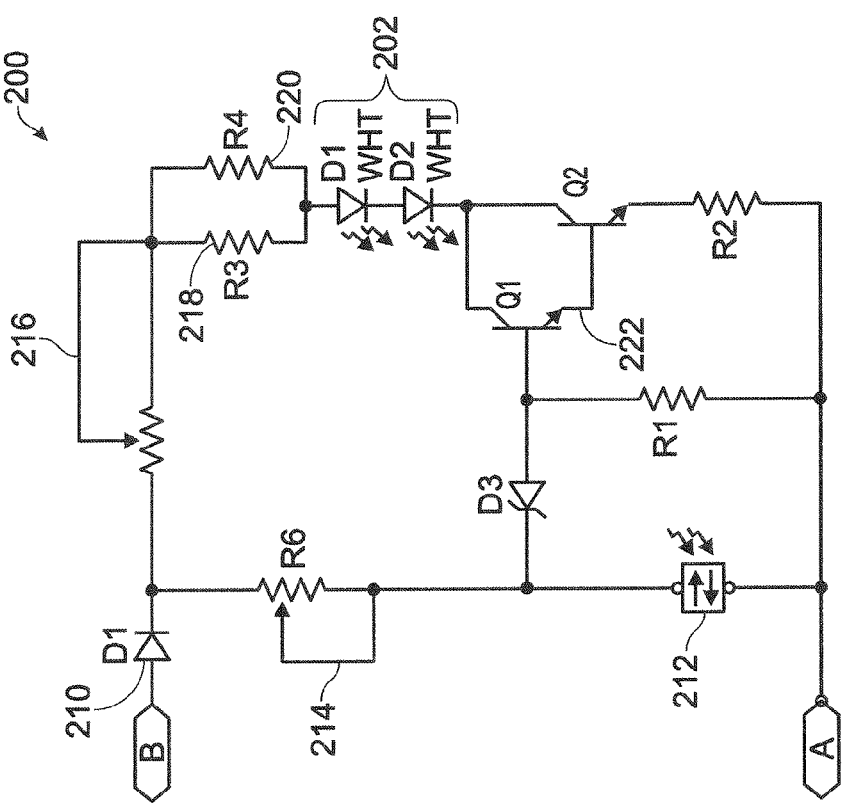
FIG. 13 is a schematic of the center night light assembly in accordance with the third embodiment of the present invention.

Referring to FIG. 13, a schematic of the center night light assembly in accordance with the third embodiment of the present invention is shown. Again, the satellite PCB 201 receives power from the receptacle terminals 30, 32, which are connected at points "A" and "B", respectively. When the ambient light is above a certain level, light sensor 212 reacts to the ambient light level and diode D3 begins to conduct. In one embodiment, sensor 212 is implemented using a light sensing diode and the amount of current conducted by sensor 212 is related to the amount of incident ambient light. As the ambient light increases past a predetermined level, which may be adjusted by potentiometer R6 in the factory, the Darlington transistor pair (Q1, Q2) are turned OFF. In particular, the current flow through D4 pulls down the base of transistor Q1. Q1, in turn, pulls down the base of Q2. When the ambient light begins to decrease, e.g., as night falls, the current flowing through sensor 212 begins to decrease accordingly. At some predetermined ambient light level, the current flowing through sensor 212 diminishes to the point where a current flow through diode D3 and resistor R1 is established. Subsequently, the transistors Q1 and Q2 are turned ON collector/emitter current in Q2 flows energizing LEDs 202.

In the schematic shown in FIG. 13, a dimmer potentiometer 216 is provided, allowing the user to adjust the brightness of the LEDs 202. In another embodiment, light sensor 212 may be implemented using a light sensing variable resistor. In this embodiment, sensor 212 and resistor 214 function as a voltage divider. Therefore, the voltage presented to diode D3 changes in accordance with the variable resistance of sensor 212. Additional features and benefits may be included. For example, the circuit may be configured to provide hysteresis. For example, the amount of ambient light at which LEDs 202 turn ON may differ from the amount of ambient light at which LEDs 202 turn OFF in accordance with the selected hysteresis curve. LEDs 202 can only be energized when two conditions are met. Device 10 must be reset and the ambient light level must fall below a predetermined level. Thus, the light assembly 200 in this embodiment is not a reset indicator per se.

In another embodiment of the present invention, the sensor circuitry may be replaced, or augmented by, proximity, motion sensing, or temperature sensing circuitry. While the sensor circuitry may function as strictly an ON/OFF control of the nightlight assembly 200, it may also be configured to regulate the power to the nightlight such that the luminous intensity is proportional to the incident ambient light. Reference is made to U.S. patent application Ser. No. 11/294,167, filed on Dec. 5, 2005, which is incorporated herein by reference as though fully set forth in its entirety, for a more detailed explanation of this type of light sensor circuitry.

Figure 14:
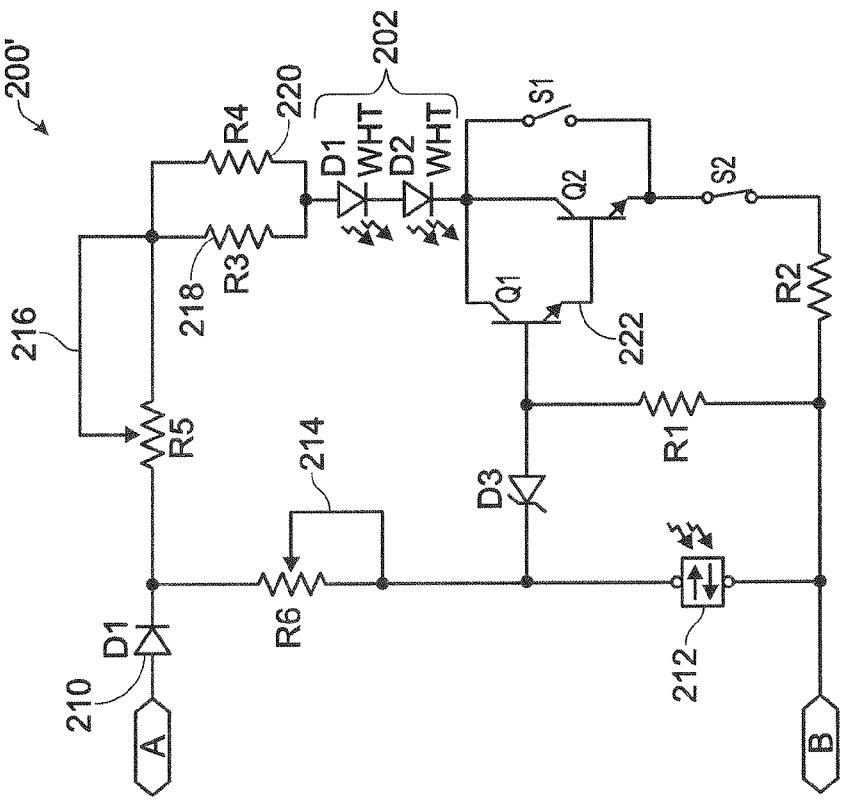
FIG. 14 is a schematic of an alternate center night light circuit in accordance with the present invention.

Referring to FIG. 14, a schematic of an alternate center night light circuit in accordance with the third embodiment of the present invention is shown. The circuit depicted herein is similar to the one shown in FIG. 13 except that dimmer potentiometer 216 is coupled to a switch S1 that is normally in the open position. Switch S1 is coupled in parallel with transistors Q1 and Q2. When the user goes beyond one of the adjustment limit of potentiometer 216, switch S1 is configured to close to provide a "full-on" bypass. In this mode, the LEDs are fully lit regardless of the intensity of the ambient light.

The dimmer potentiometer 216 is also coupled to a switch S2 that is normally in the closed position. Switch S2 is connected in series with transistors Q1 and Q2. When the user adjusts potentiometer 216 beyond the other adjustment limit of potentiometer 216, switch S2 is configured to open to provide a "full-off" bypass. In this mode, the LEDs are never lit regardless of the intensity of the ambient light. Those of ordinary skill in the art will understand that switch S1 and switch S2 may be used alone or in combination with each other.

Figure 15:
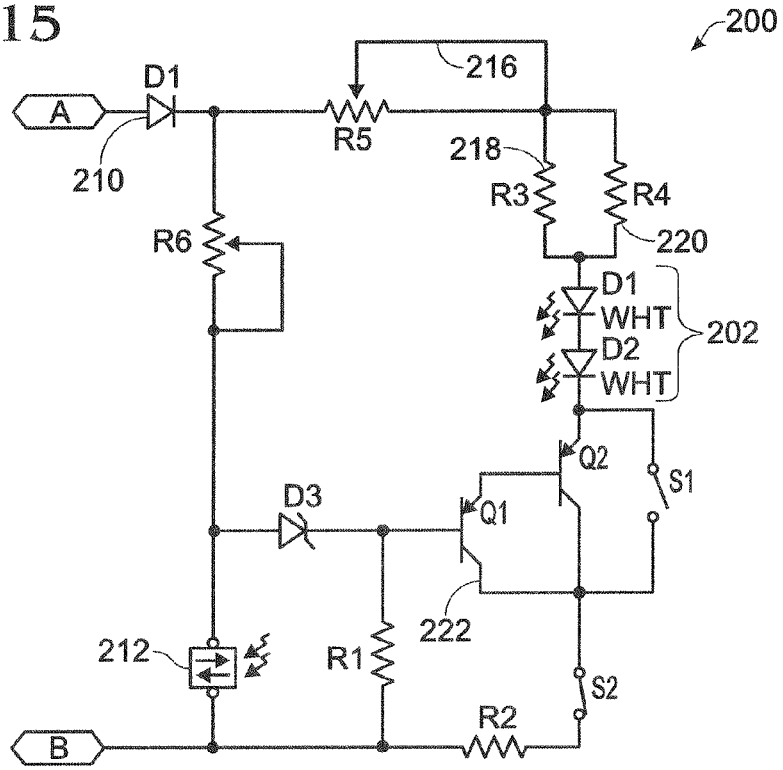
FIG. 15 is a schematic of yet another alternate center night light assembly in accordance with the present invention.

FIG. 15 is a schematic of yet another alternate center night light assembly in accordance with the third embodiment of the present invention. In this embodiment, light assembly 200 is an "intelligent pilot light," meaning that more light is emitted in response to a greater amount of room ambient light. Photosensitive device 212 conducts an amount of current governed by the intensity of ambient light. When the intensity of the ambient light increases beyond some preset value, the current propagating through D3 will turn on Q1 and Q2. As a result, diodes D1 and D2 emit light. As the room ambient light increases, Q1 and Q2 are ON for a longer duty cycle and D1 and D2 emit an increasing intensity of light Dimmer potentiometer 216 allows a user to adjust the intensity of the light emitted by D1 and D2. Switch S1 or S2 may be included. They provide a similar functionality to S1 and S2 described in FIG. 20.

In another embodiment of the present invention, a secondary power source, such as a battery or a charged capacitor, may be disposed within the housing 12 as a back-up power source when the primary AC power source provided by the electrical distribution system has failed. Reference is made to U.S. patent application Ser. No. 11/294,167, filed on Dec. 5, 2005, which is incorporated herein by reference as though fully set forth in its entirety, for a more detailed explanation of a secondary power source.

Figure 16:
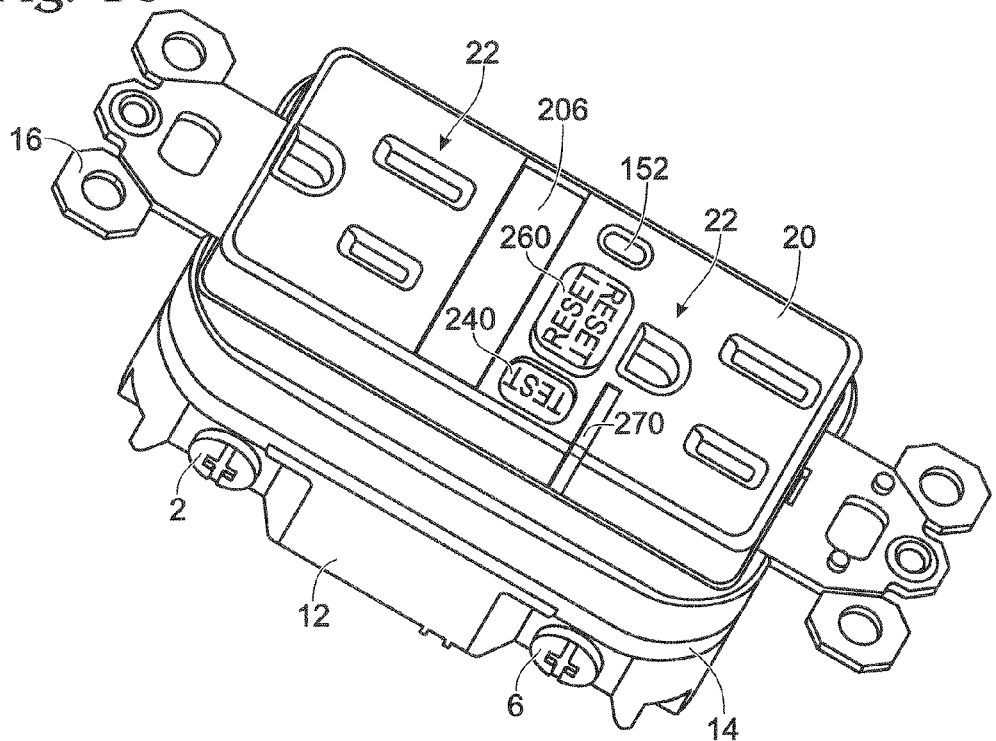
FIG. 16 is a perspective view of the fully assembled device in accordance with the third embodiment of the present invention.

Referring to FIG. 16, a perspective view of the fully assembled device 10 in accordance with the third embodiment of the present invention is disclosed. This view illustrates the novel arrangement of the light assembly lens 206, indicator lens 152, test button 240, reset button 260, and sensor lens 270 within the space between the receptacle openings 22 in cover 20.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed. No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. An electrical wiring device comprising:
    a housing including a plurality of line terminals and a plurality of load terminals accessible via an exterior portion thereof, the housing including a plurality of receptacle terminals disposed therein, the housing further including a front cover portion having a central region, the front cover portion also including a plurality of receptacle openings in communication with the plurality of receptacle terminals, the device being in a properly wired state when the plurality of line terminals are coupled to a source of AC power, the device being in a miswired state when the plurality of load terminals are coupled to the source of AC power;
    a fault detection assembly coupled to the plurality of line terminals, the fault detection circuit being configured to provide a fault detection output in response to detecting a fault condition;
    a circuit interrupter including a first set of interrupting contacts configured to provide electrical continuity between the plurality of line terminals and the plurality of load terminals in a reset state and configured to interrupt the electrical continuity in a tripped state in response to the fault detection output;
    a protective assembly coupled to the plurality of receptacle terminals, the protective assembly being configured to prevent AC power from being accessed via the plurality of receptacle openings when the device is in the miswired state; and
    a light assembly including a plurality of light emitting elements coupled to a lighting control circuit, the light assembly also including a light transmission region disposed in the front cover portion and occupying a substantial portion of a width of the front cover portion, the lighting control circuit selectively driving the plurality of light emitting elements from a deenergized state to a light emitting state in response to a predetermined stimulus, the light emitting state being indicative of the reset state or an ambient light condition.

2. The device of claim 1, wherein the protective assembly includes a miswire detection circuit configured to prevent the circuit interrupter from maintaining the reset state in the miswired state.

3. The device of claim 1, wherein the protective assembly includes a wiring state detection circuit coupled to at least one shutter assembly disposed between the plurality of receptacle openings and the plurality of receptacle terminals, the at least one shutter assembly being responsive to the wiring state detection circuit, the at least one shutter assembly being in a locked state when the device is in the miswired state.

4. The device of claim 3, wherein the wiring state detection circuit is configured to unlock the at least one shutter assembly in response to detecting the proper wiring state.

5. The device of claim 1, wherein the protective assembly includes a wiring state detection circuit configured to propagate a predetermined signal in response to the proper wiring state, the wiring state detection circuit substantially preventing the circuit interrupter from establishing the reset state before the predetermined signal is propagated, AC power being substantially accessible via the plurality of receptacle openings in the reset state.

6. The device of claim 5, wherein the wiring state detection circuit is substantially disabled after the plurality of line terminals are properly connected to a source of AC power.

7. The device of claim 5, wherein the wiring state detection circuit further comprises a switch element, the wiring state detection circuit being inoperative when the switch is in an open state.

8. The device of claim 7, wherein the wiring state detection circuit is enabled when the switch is in a closed state.

9. The device of claim 5, wherein the wiring state detection circuit includes at least one fusible element configured to open-circuit a predetermined period of time after the AC power is coupled to the plurality of line terminals.

10. The device of claim 9, wherein the at least one fusible element includes at least one resistor.

11. The device of claim 1, further comprising at least one protective shutter assembly disposed in the front cover portion between the plurality of receptacle openings and the plurality of receptacle terminals, the at least one protective shutter assembly being configured to move from a closed position to an open position only in response to engaging a set of plug blades to thereby establish electrical continuity between the plurality of receptacle terminals and the set of plug blades.

12. The device of claim 11, wherein the at least one protective shutter assembly is a frameless shutter assembly comprising a first shutter member and a second shutter member configured to move from a closed position to an open position only in response to engaging a set of plug blades having at least one predetermined plug blade geometry.

13. The device of claim 12, wherein the first shutter member and the second shutter member include shutter features configured to prevent the protective shutter assembly from being driven from the closed position into the open position if only one object is inserted into only one receptacle opening, or if two foreign objects are inserted into two receptacle openings of a set of receptacle openings, or if a set of plug blades that does not have at least one predetermined plug blade geometry is inserted into the set of receptacle openings.

14. The device of claim 1, wherein the lighting control circuit includes an ambient light sensor responsive to the ambient light condition, the lighting control circuit being configured to drive the plurality of light emitting elements to the light emitting state when the ambient light sensor signal indicates that the incident ambient light level is below a predetermined threshold.

15. The device of claim 1, wherein the lighting control circuit includes an ambient light sensor responsive to the ambient light condition, the lighting control circuit being configured to regulate an intensity of the light emitted by the plurality of light emitting elements in accordance with the incident ambient light level.

16. The device of claim 15, wherein the lighting control circuit is configured to increase an intensity of the light emitted by the plurality of light emitting elements as the incident ambient light level decreases.

17. The device of claim 15, wherein the lighting control circuit is configured to increase an intensity of the light emitted by the plurality of light emitting elements as the incident ambient light level increases.

18. The device of claim 1, wherein the lighting control circuit further comprises:
- a user accessible control element; and
- a dimmer circuit coupled to the user accessible control element and a plurality of light emitting diodes, the dimmer circuit being configured to regulate an intensity of light being emitted by the light emitting diodes.

19. The device of claim 18, wherein the light assembly further comprises:
- a reflector member disposed in the central region, the plurality of light emitting elements being disposed in the reflector member; and
- a lens element disposed in the light transmissive region and covering the reflector member, the lens element being configured to refract light emitted by the light emitting diodes in accordance with a predetermined pattern.

20. The device of claim 19, further comprising a separator member that divides the housing into two compartments, the reflector member being disposed in the separator member, the front cover portion, or between the separator member and the front cover portion.

21. The device of claim 1, further comprising a unitary indicator element coupled to the plurality of line terminals.

22. The device of claim 21, wherein the unitary indicator element is a trip indicator or a miswire indicator.

23. The device of claim 1, wherein the fault detection assembly is disposed on a first printed circuit board and the light assembly is disposed on a second printed circuit board.

24. The device of claim 1, wherein the light assembly includes an ambient light sensor, the lighting control circuit and the plurality of light emitting elements being implemented on a printed circuit board.

25. The device of claim 24, wherein the ambient light sensor is coupled to the printed circuit board by a stand-off element disposed between the printed circuit board and the ambient light sensor.

26. The device of claim 24, further including a lens element attachable to the front cover portion in the light transmissive region, the lens element being configured to transmit the light emitted by the plurality of light elements into a volume of space surrounding an exterior surface of the front cover portion.

27. The device of claim 26, wherein the ambient light sensor is disposed proximate an inside surface of the lens element.

28. The device of claim 26, wherein the exterior surface of the lens element is substantially flush with a major front surface of the front cover portion.

29. The device of claim 26, wherein the ambient light sensor is not disposed behind the lens element.

30. The device of claim 29, further including a second lens element attachable to the front cover portion, the second lens element being configured to enclose the ambient light sensor within a portion of the front cover portion.

31. The device of claim 30, wherein the second lens element is spatially separated from the lens element.

\* \* \* \* \*